United States Patent
Mendonsa et al.

(10) Patent No.: US 10,332,557 B1
(45) Date of Patent: Jun. 25, 2019

(54) MULTITRACK SERVO MARKS WITH PERPENDICULAR AND LONGITUDINAL MAGNETIC FIELDS

(71) Applicant: Seagate Technology LLC, Cupertino, CA (US)

(72) Inventors: Riyan Mendonsa, Minneapolis, MN (US); Puskal Prasad Pokharel, Edina, MN (US); Walter R. Eppler, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/130,451

(22) Filed: Sep. 13, 2018

(51) Int. Cl.
  *G11B 5/596* (2006.01)
  *G11B 23/18* (2006.01)
  *G11B 20/12* (2006.01)
  *G11B 5/74* (2006.01)
  *G11B 5/09* (2006.01)

(52) U.S. Cl.
  CPC ............... *G11B 23/18* (2013.01); *G11B 5/09* (2013.01); *G11B 5/59638* (2013.01); *G11B 5/59688* (2013.01); *G11B 5/746* (2013.01); *G11B 20/1217* (2013.01)

(58) Field of Classification Search
  CPC ... G11B 15/463; G11B 15/52; G11B 5/59688; G11B 5/59633; G11B 5/5543; G11B 5/59627; G11B 5/012; G11B 5/02; G11B 20/1219; G11B 2020/1238
  USPC .......... 360/73.12, 77.01, 77.05, 77.06, 78.14
  See application file for complete search history.

(56) References Cited

U.S. PATENT DOCUMENTS

| | | |
|---|---|---|
| 4,803,571 A | 2/1989 | Fujioka et al. |
| 5,485,321 A | 1/1996 | Leonhardt et al. |
| 5,956,216 A | 9/1999 | Chou |
| 6,885,514 B1 | 4/2005 | Codilian et al. |
| 7,221,530 B2 * | 5/2007 | Tomiyama ............. G11B 5/012 360/55 |
| 8,693,134 B1 | 4/2014 | Xi et al. |
| 9,087,541 B1 | 7/2015 | Pokharel et al. |
| 9,245,579 B2 | 1/2016 | Song et al. |
| 9,818,445 B2 | 11/2017 | Zhu et al. |
| 9,824,703 B2 | 11/2017 | Sugawara et al. |
| 9,972,349 B1 | 5/2018 | French, Jr. et al. |
| 10,002,625 B1 | 6/2018 | Erden |
| 2005/0152067 A1 | 7/2005 | Yip et al. |

* cited by examiner

*Primary Examiner* — Nabil Z Hindi
(74) *Attorney, Agent, or Firm* — Hollingsworth Davis, LLC

(57) ABSTRACT

A servo sector on a disk is read via first and second readers that both span two or more user data tracks. The servo sector has a crosstrack width that spans the two or more user data tracks. The first reader provides a first signal based on detecting a total longitudinal field of the servo sector. The second reader provides a second signal based on detecting a total perpendicular field of the servo sector. A position error of the first and second readers is detected using. A value of the first signal can be used to detect a position error, detect a track-to-track phase error, and/or detect a Gray code error of a track ID field of the servo sector.

20 Claims, 7 Drawing Sheets

MULTITRACK SERVO MARKS WITH PERPENDICULAR AND LONGITUDINAL MAGNETIC FIELDS

SUMMARY

Various embodiments described herein are generally directed to a using multitrack servo marks with perpendicular and longitudinal magnetic fields. In one embodiment, a servo sector on a disk is read via a first reader that has a first effective width spanning two or more user data tracks. The servo sector has a crosstrack width that spans the two or more user data tracks. The first reader provides a first signal based on detecting a total longitudinal field of the servo sector. The servo sector is read via a second reader that has a second effective width spanning the two or more user data tracks. The second reader provides a second signal based on detecting a total perpendicular field of the servo sector. A position error of the first and second readers is detected using a value of the first signal obtained while traversing a burst field of the servo sector. In another embodiment, a track-to-track phase error of the servo sector is detected using a value of the first signal obtained while traversing a preamble of the servo sector. In another embodiment, a Gray code error of a track ID field of the servo sector is corrected using a value of the first signal obtained while traversing the track ID field.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Recording schemes have been developed to increase areal density for conventional magnetic recording (CMR) devices, e.g., perpendicular magnetic recording (PMR) as well as devices using newer technologies, such as heat-assisted magnetic recording (HAMR), microwave-assisted magnetic recording (MAMR) and bit-patterned media (BPM). Other recording schemes such as shingled magnetic recording (SMR) and interlaced magnetic recording (IMR) can also increase areal density by using track formats that overlap tracks to decrease effective track width. Both SMR and IMR can be together used with CMR, HAMR, MAMR, BPM, etc.

These advanced recording schemes may operate on the assumption of a one-dimensional (1-D) system design and drive architecture. On the other hand, magnetic recording media surface, in principle, provides a two-dimensional (2-D) environment. It is the system design and the resulting drive architecture which constrains inherently a 2-D system to 1-D system, mainly because of historical cost and complexity arguments. Thus, in parallel with HAMR and BPM development, the constraints limiting the overall design to 1-D are being further explored to see if the current recording technology can support higher AD and/or better drive performance if some of those constraints are modified by making the system utilize the 2-D nature of the media surface, which is called two-dimensional magnetic recording (TDMR).

In a TDMR device, multiple readers are used, and they sense magnetic fields in one direction, for example, perpendicular to the media surface for PMR. However, based on what is written on the surface of the media and the location of the reader, magnetic fields emerge in other directions which cannot be detected by the current readers employed in today's drives. In particular, a recording scheme referred to herein as vector recording or quadrature recording can increase performance by sensing both perpendicular and in-plane (or longitudinal) magnetic fields. Vector recording generally uses multiple readers over multiple tracks, overall sensing two or more orthogonal magnetic field directions of the recording media.

Figure 1:
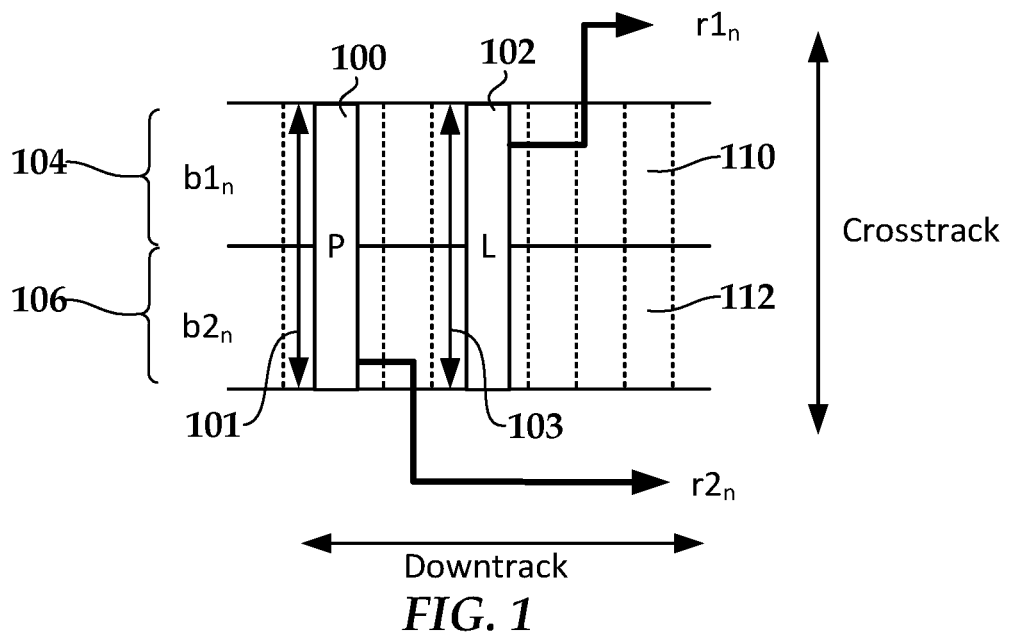
FIG. 1 is a block diagram illustrating a vector recording scheme according to example embodiments.

In FIG. 1, a diagram illustrates a vector recording scheme according to an example embodiment. A first reader 100 (P) (also referred to herein as a read transducer) has an effective width 101 that spans at least two tracks 104, 106. The first reader 100 senses total, multitrack magnetic fields perpendicular to the media surface 104. A second reader 102 (L) has an effective width 101 that spans at least two tracks 104, 106. The second reader 102 senses total, multitrack magnetic fields in a plane parallel to the media surface 104, also referred to as in-plane or longitudinal fields. In response to detecting these fields, the first and second readers 100, 102 provide first and second signals $r1_n$, $r2_n$. Additional details of vector recording are described in U.S. patent application Ser. No. 16/048,768, filed Jul. 30, 2018, (hereinafter the '768 Application) which is hereby incorporated by reference in its entirety. Note that the readers 100, 102 may be placed in any orientation relative to one another in a downtrack direction. Further, the effective widths 101, 103 may be the same or different, and may be smaller or larger than indicated relative to tracks 104, 106.

In FIG. 1, the bit boundaries of the tracks are indicated by dashed lines in a cross-track direction. In many of the embodiments described herein, the bits between two adjacent tracks are aligned so that the readers 100, 102 read bits from both tracks at the same time. These bits are referred to herein as aligned or corresponding bits. An example pair of aligned/corresponding bits 110, 112 is shown in tracks 104, 106, respectively. These bits jointly encode data that is read by the individual readers 100, 102 based on the combined magnetic field of the bits 110, 112. Note that the readers 100, 102 are offset in the downtrack direction, and so combining the signals r1$_n$, r2$_n$ from the first and second readers 100, 102 may involve buffering at least one signal as well as detecting and applying a time offset between the signals that corresponds to the downtrack separation of the readers 100, 102 at a particular location where the tracks 104, 106 are moving under the readers.

The first, perpendicular, reader 100 can sense signals when the two adjacent track bits 110, 112 are the same. If those bits are different, the output of the perpendicular reader 100 will be at or near zero. While perpendicular reader 100 can be used when the two adjacent track bits 110, 112 are the same, the reader 100 cannot resolve which bits 110, 112 have the positive and negative fields. The second, longitudinal reader 102 can sense signals when bits 110, 112 written at adjacent tracks have different signs, and further can tell which bit is positive and which is negative. This is because a region between the bits 110, 112 will have a crosstrack field in a direction that depends on which bit 110, 112 is positive and which is negative. Thus, the two readers 110, 112 shown in FIG. 1 can be used to jointly detect the bits written at two adjacent tracks.

Figure 2:
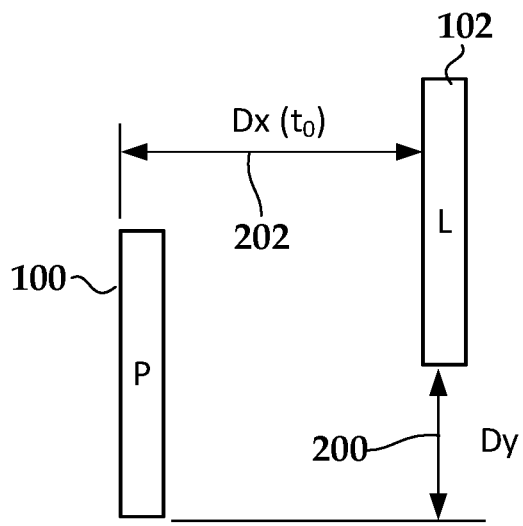
FIG. 2 is a diagram showing reader offsets according to example embodiments.

As vector recording is being developed, a servo system can be adapted to make full use of the multitrack capabilities of the readers 100, 102 and increase robustness. As seen in FIG. 2, the two readers 100, 102 can have two offsets from one another that are dealt with in a servo system according to an example embodiment. The Dy offset 200 is a crosstrack offset between readers and the Dx offset 202 is a downtrack offset. These offsets may change based on skew angle, and may be affected by other operating conditions, such as thermal expansion of the head. As indicated by the to identifier, the Dx offset 202 will have an effect on relative timing between signals generated via the readers 100, 102.

Figure 3:
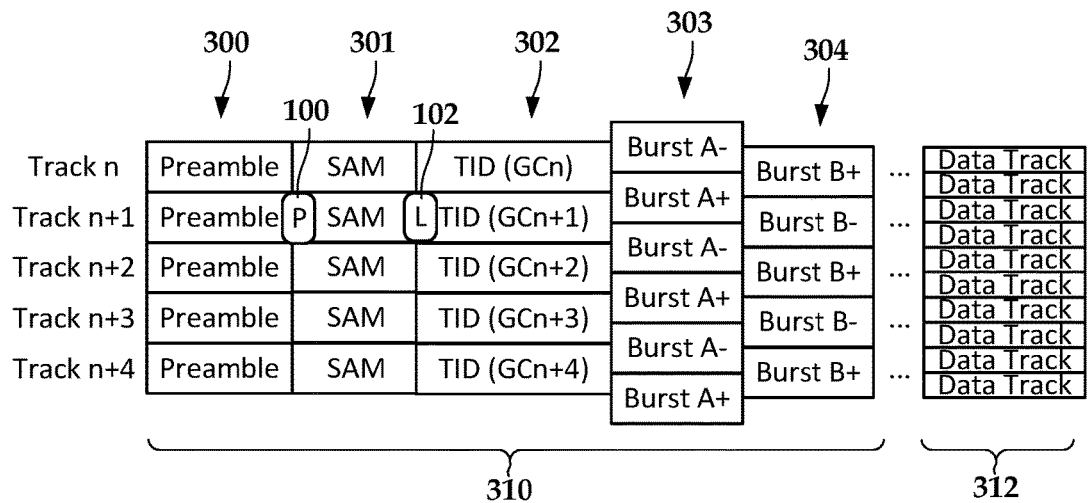
FIGS. 3 and 4 are block diagrams of servo sector formats according to example embodiments.

In FIG. 3, a block diagram illustrates a servo and track arrangement according to an example embodiment. A plurality of servo sectors 310 (also sometimes referred to as servo wedges or servo marks) for tracks N through N+4 are each formed from fields 300-304. The preamble field 300 and servo address mark (SAM) 301 are patterns that allows the reader to identify the start of each servo sector 310. The track identifier (TID) 302 is a Gray-coded field that identifies the identity of the track and servo. Burst fields 303 and 304 are fields with different frequency tones that are crosstrack-offset from one another by half a track. The burst fields 303 and 304 are used to detect a crosstrack offset of the readers 100, 102, which is used to form a position error signal (PES) used by a servo controller. Following the servo sectors 310 are data tracks 312 upon which the user data is stored. While this and other embodiments show readers 100, 102 that span two user data tracks and servo sectors (e.g., 310) that also span two or more user data tracks, this can be extended to wider readers and servo sectors that span more than two user data tracks.

One thing to note is the reduction in the tracks-per-inch (TPI) requirements for the servo sectors 310 is halved as each reader covers two data tracks 312 at a time. The data tracks 312 may be regularly overwritten by one or more writers having a TPI requirement that conforms to the tracks 312. The writers may write simultaneously with a small offset or during separate rotations of the disk. The servo sectors 310 may be written by a writer with half the TPI requirement of the data tracks 312 (thus twice the track width), such that only one magnetic field (e.g., perpendicular) is used to encode the servo data and only one reader 100, 102 is used to read the servo data. In other embodiments, the servo sectors 310 may be formed similar to the data tracks 312 with both longitudinal and perpendicular magnetic fields, such that both readers 100, 102 can be used to read servo data. For purposes of the following discussion, the latter configuration will be referred to as a multitrack servo format, wherein each of the servo sectors 310 is formed of multiple tracks similar to the user data tracks 312. While the data of the individual one of the multiple tracks may be different, they jointly encode an individually addressable multitrack of data, the multitrack track having both longitudinal and perpendicular fields.

One issue seen with the TID field 302 is a flipped bit of the track ID when traversing adjacent multitracks. As noted above, track IDs are formatted as a Gray code. Generally, a Gray code represents a sequence of ordered symbols (e.g., numbers) as binary values that differ by only one bit between consecutive symbols. Thus, the ID of two adjacent track IDs should be different by just one bit. The drive also sees the PES burst data from fields 303, 304 and knows that it is centered over a track, and based on the phase of the bursts, it determines the track ID being odd or even. However, if a bit is flipped in the track ID, it results in the servo system indicating that the next track is not adjacent to the previously traversed track, in what may be referred to as a two-track error. Conventionally, a two-track error is declared a servo error (unsafe), and results in an error recovery procedure, e.g., a second pass over affected the servo sector to verify location.

Having the servo sectors 310 matched to two orthogonal readers allows for improved identification of a flipped bit in the Gray code of the TID field 302 and compensate for two-track errors in the TID field. If two bits are found to have changed between consecutive Gray codes, then the system needs a procedure to determine the correct value of the code. In the embodiment shown above, the longitudinal and perpendicular magnetic fields in each bit of the TID field 302 may be configured to carry redundant information to find and correct errors in the Grey code.

For example, if just perpendicular field across the two tracks is used to store the multitrack Grey code, then the perpendicular field should be non-zero (e.g., positive or negative corresponding to a 0 or 1, for example), in which case the total longitudinal field should be at or near zero. In such an arrangement, if two flipped bits are found in the Gray code and one of the flipped bits has a non-zero longitudinal field, then this is likely the bit that was read in error. Other arrangements for coding of the data in servo sectors using the longitudinal and perpendicular magnetic fields may be devised, e.g., storing two bits in each bit interval as described for reading user data in the '768 Application.

Figure 4:
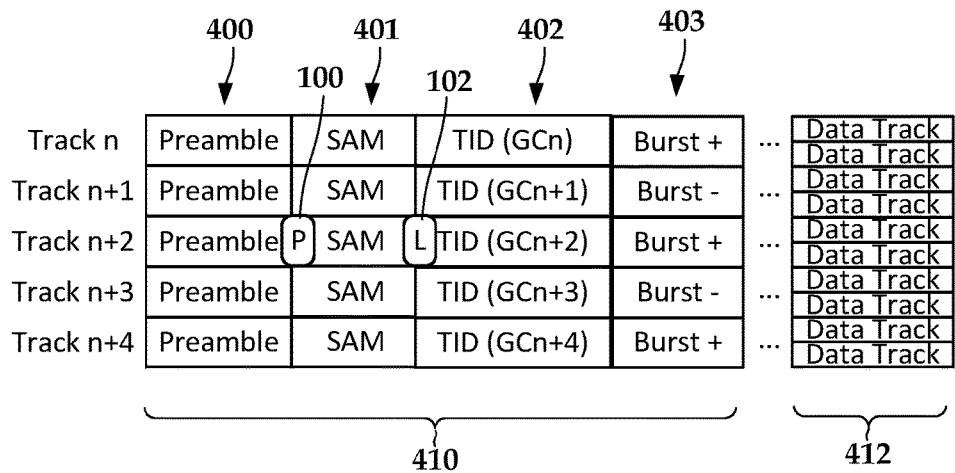

The use of longitudinal and perpendicular magnetic fields in a servo mark can also eliminate the need for a two offset servo bursts, such as servo burst fields 303 and 304 in FIG. 3. In FIG. 4, a block diagram illustrates a servo and track arrangement according to another example embodiment. A plurality of servo sectors 410 for tracks N through N+4 each include a preamble 400, SAM 401, and TID 402 as previously described for the servo sectors 310 in FIG. 3. In this case, a single burst field 403 is used for each servo sector 410 and pair of user data tracks 412. Note the burst field 403 is aligned with the other fields of the servo sector. The burst field uses the orthogonality of the two readers 100, 102 to detect PES.

In one embodiment, the burst fields 403 have alternative perpendicular fields with an opposite phase between adjacent tracks. So, for example, if Track n+1 had a 2T burst field 403 with perpendicular field of {−1, −1, 1, 1, −1, −1, . . . }, the adjacent tracks Track n and Track N+2 would have the opposite field of {1, 1, −1, −1, 1, 1, . . . . }. Therefore, if the heads 100, 102 are perfectly aligned on Track n+1, the longitudinal reader 102 would have at or near zero output, and the perpendicular reader 100 would be at a maximum. As the heads 100, 102 move from the center of the Track n+1, the output of the longitudinal reader 102 would increase, and the output of the perpendicular reader 100 would decrease.

Figure 5:
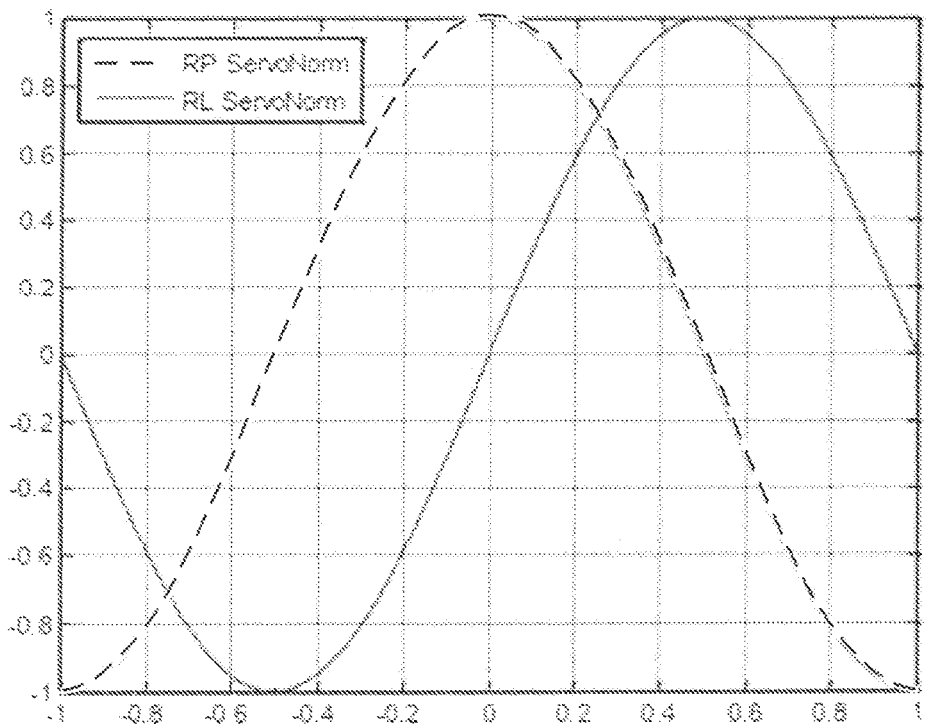
FIG. 5 is a graph showing perpendicular and longitudinal position error signal values according to an example embodiment.

In FIG. 5, a graph shows a normalized cross track PES signal for the perpendicular reader (RP) and the longitudinal reader (RL). The horizontal axis represents an offset from track center, and the vertical axis represents a normalized PES. Note that the relative shifting between the RP and RL curves allows the servo system to estimate both the magnitude and direction of crosstrack offset. For example, at offset 0.2 and −0.2, absolute value of the RL amplitude in both cases is 0.6, but the sign of the RL output is different depending on whether the offset is positive or negative.

In reference again to FIGS. 3 and 4, it can be seen that the removal of the second burst 303 as shown in FIG. 3 will increase the servo format efficiency, as the arrangement shown in FIG. 4 can use less disk space for servo data. Also since the bursts 403 are in line with the TID 402, the number of passes to write the servo patterns 410 are halved. The double-track-pitch servo patterns 410 can also be written in a single pass by a wide writer, e.g., via a multi-disk writer (MDW). When combining the improvements from not using offset burst patterns with the gain from the servo pattern 410 being written by a double-track-pitch writer, this leads to a nearly four times improvement in servo writing time compared to a conventional, single-track arrangement.

Figure 6:
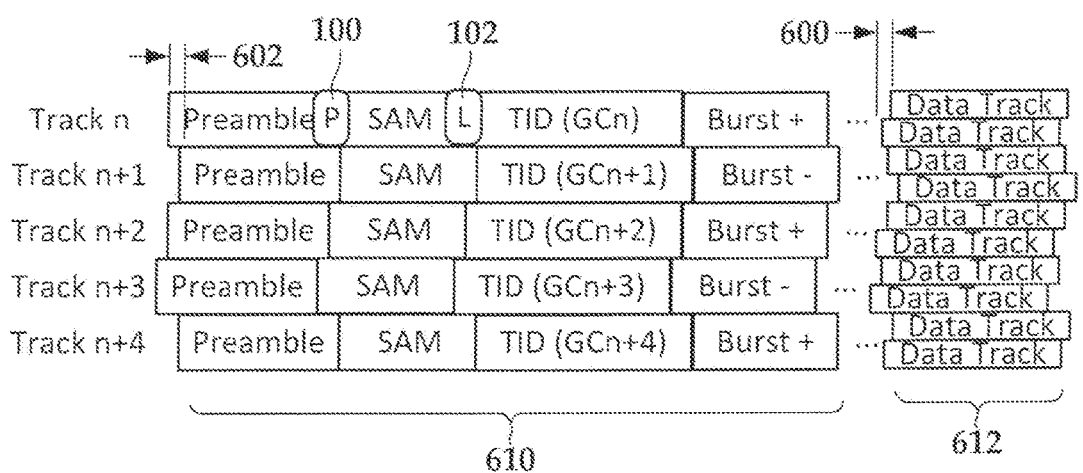
FIGS. 6 and 7 are block diagrams illustrating track-to-track phase error in servo sectors according to example embodiments.

As TPI and the linear bit density increase, the effects of stitching coherency and curvature also are becoming issues. Generally this refers to track-to-track phase errors (TTPE) and two track errors. In FIG. 6, a block diagram shows an example of TTPE according to an example embodiment. A series of adjacent servo sectors 610 and user data tracks 612 are shown with TTPE, which is caused by a misalignment of bit transitions between adjacent tracks. For example, transition offset 600 between the tracks within Track n will be present in the servo sectors 610 and will result in TTPE therein. The multitracks (identified as Track n to Track n+4) may also exhibit multitrack phase errors, as indicated by multitrack-to-multitrack offset 602.

Figure 7:
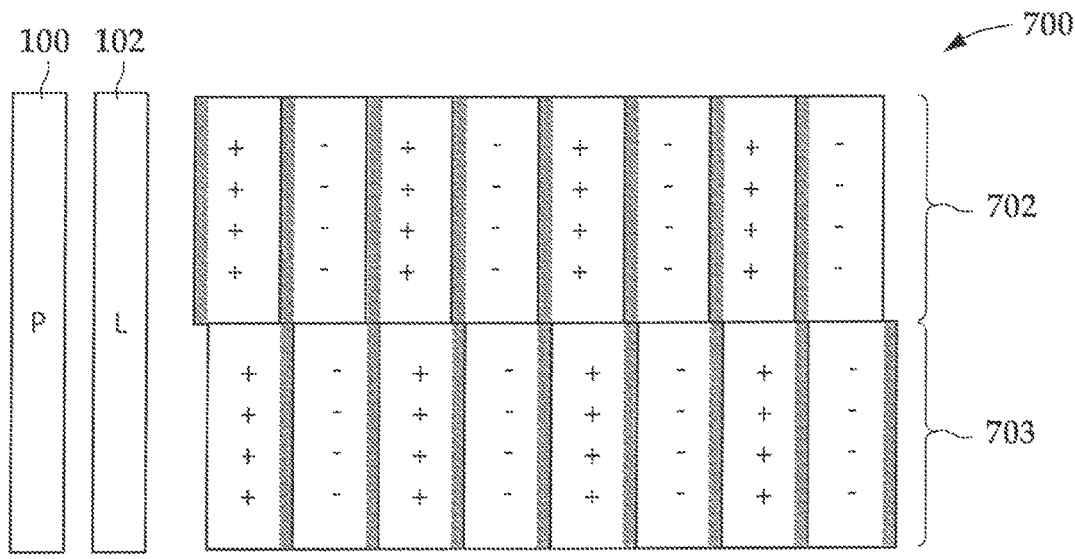
Figure 8:
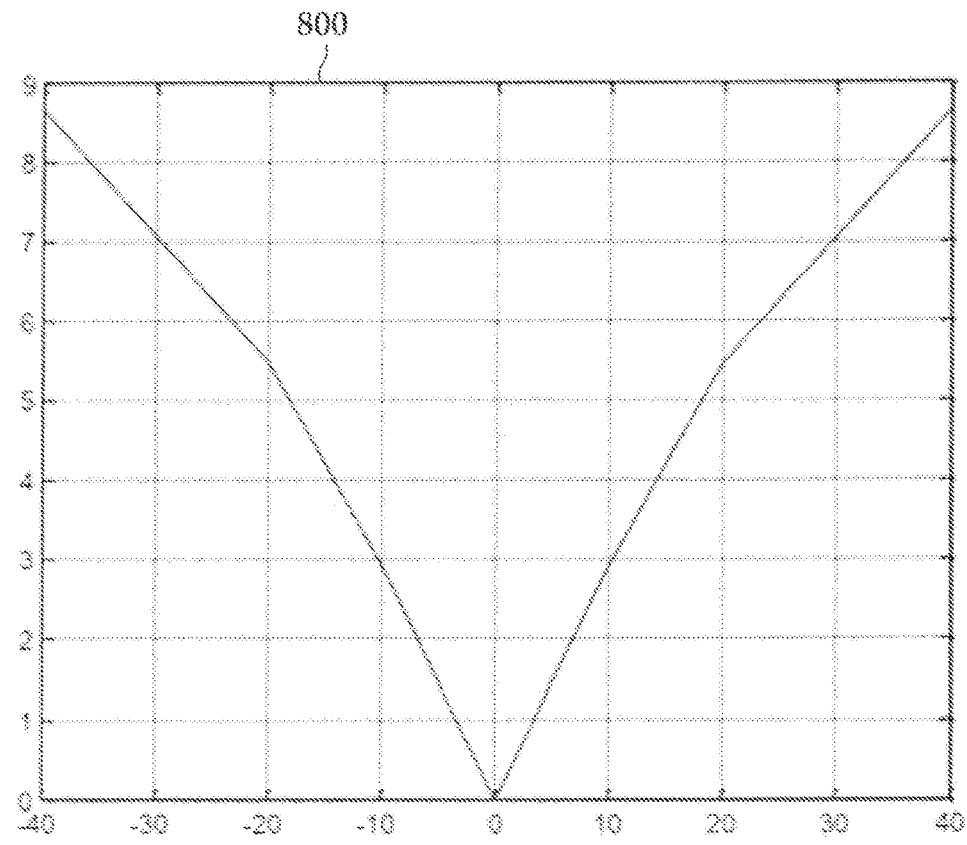
FIG. 8 is a graph showing a longitudinal signal response to track-to-track phase errors according to an example embodiment.

In FIG. 7, a block diagram illustrates an example of a multitrack preamble 700 with non-zero TTPE according to an example embodiment. The shaded areas indicate where tracks 702, 703 are offset. In these shaded areas, the longitudinal reader 102 will exhibit a non-zero response. In FIG. 8, a graph 800 shows results of a simulation of a longitudinal reader symbol over a preamble similar to what is shown in FIG. 7. The vertical axis of the graph 800 is a normalized amplitude of longitudinal reader 102 and the horizontal axis is a TTPE expressed as a percentage of bit length.

Figure 9:
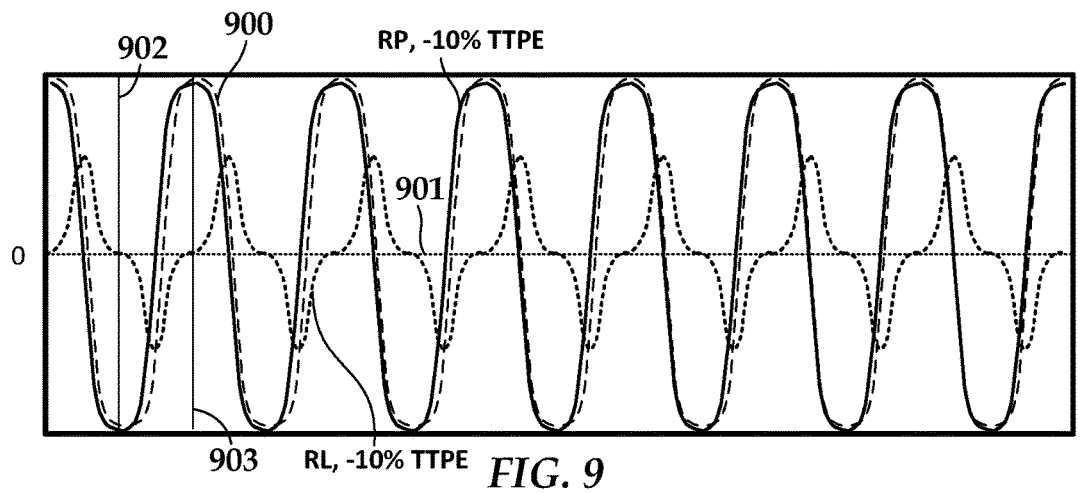
FIGS. 9-11 are a graphs showing perpendicular and longitudinal signals for various values of track-to-track phase error according to an example embodiment.
Figure 10:
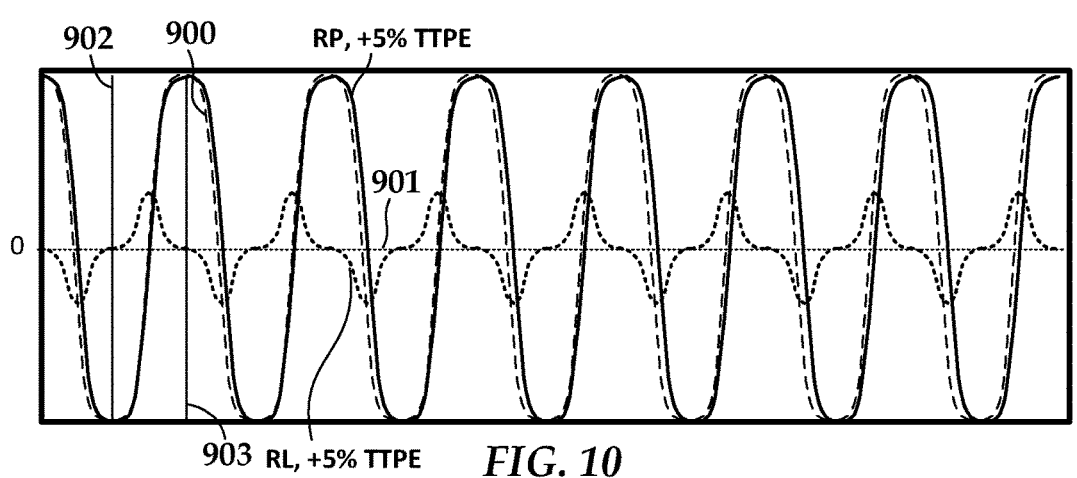
Figure 11:
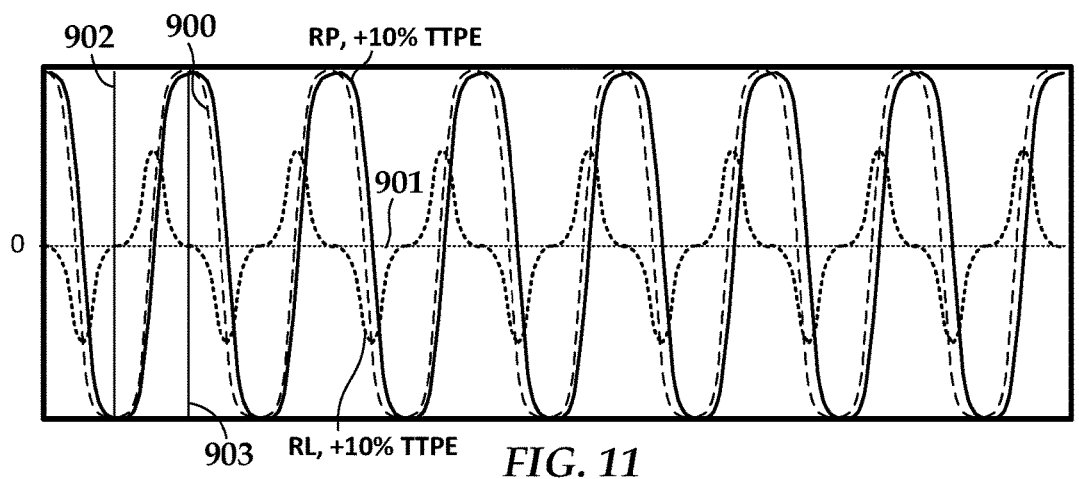

In FIGS. 9, 10, and 11, graphs show simulated responses of the RL and RP readers to ±10% and +5% of TTPE over an ideal preamble according to an example embodiment. The vertical axis in these graphs is a normalized amplitude of the respective RL and RP readers, and the horizontal axis is time. In all of the figures, the dashed curve 900 represents the RP response at 0% TTPE. The RL response at 0% TTPE is the zero-amplitude line 901. As can be seen from FIGS. 9-11, for non-zero TTPE the RL is a signal having the same frequency as the preamble and with properties (e.g., phase) based on the level of TTPE. The amplitude of the TTPE can be obtained from the maximum amplitude of the RL signal and the direction of the TTPE can be determined based on a phase of the RL signal. For example, note the inversion of the RL waveform between the −10% and +10% TTPE in FIGS. 9 and 11, which may also be considered a 90 degree phase shift.

Note that in FIGS. 9-11 the zero crossings of the RL signal (e.g., at vertical lines 902, 903) coincide with the peak of the RP clean signal 900. These zero crossing times 902, 903 can be used to improve timing recovery despite the effects of TTPE. The TTPE information can be used to correct for the effects seen over not only the SAM and TID portion of the servo marks but also over the fine-position bursts and user data. It should be understood that the TTPE information can be similarly derived from other servo fields as well, such as fields that contain a tone or other known pattern, such as the SAM or burst fields. Because the preamble is the first field encountered by the read heads, it presents the earliest opportunity to detect TTPE and can be used to improve timing recover for the subsequent fields in the servo sector. However, detecting TTPE in the other fields can also be used for subsequent validation and/or adjustment of the timing corrections.

Figure 12:
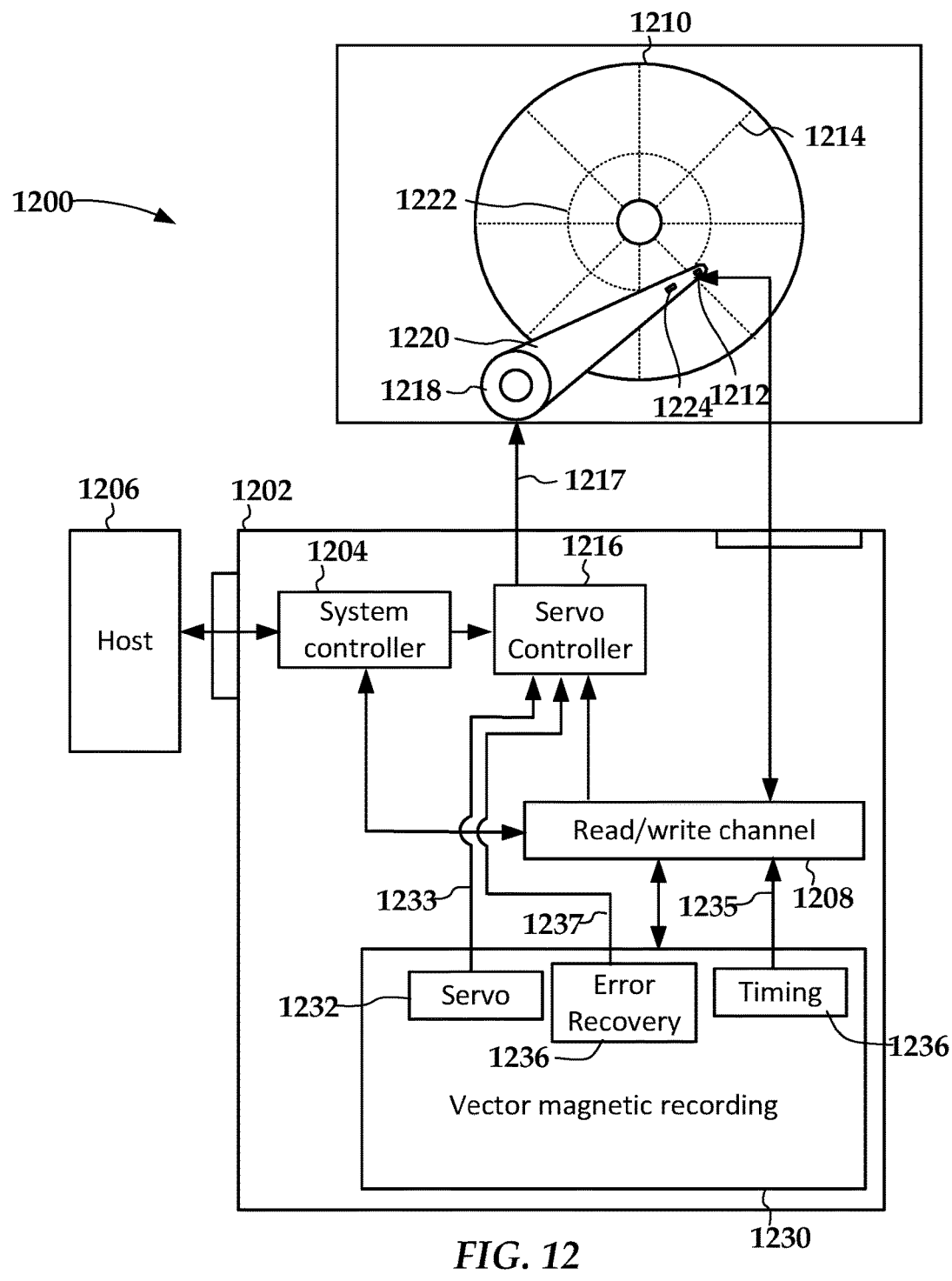
FIG. 12 is a block diagram of an apparatus according to an example embodiment.

In FIG. 12, a diagram illustrates components of a storage drive apparatus 1200 that utilizes one or more read/write heads 1212 according to example embodiments. The read/write head 1212 is mounted to a head-gimbal assembly and at least one of the heads 1212 or head-gimbal assemblies is configured with at least first and second read transducers, or readers. The first reader spans two tracks of the disk 1210 and provides a first signal responsive to a first total longitudinal field of the tracks. The second signal spans the two and provides a second signal responsive to a second total longitudinal field of the two tracks.

The apparatus 1200 includes one or more circuit boards 1202 such as a system controller 1204 that processes read and write commands and associated data from a host device 1206. The host device 1206 may include any electronic device that can be communicatively coupled to store and retrieve data from a data storage device, e.g., a computer. The system controller 1204 is coupled to a read/write channel 1208 that reads from and writes to surfaces of one or more magnetic disks 1210. The read/write channel 1208 generally converts data between the analog signals used by the heads 1212 to the digital data used by the system controller 1204 for host communications.

The read/write channel 1208 may include analog and digital circuitry such as detectors, timing-correction units, equalizers, error correction units, preamplifiers, filters, digital-to-analog converters, analog-to-digital converters, etc. The read/write channel 1208 may have particular features that facilitate reading the first and second signals. For example, the read/write channel may have analog front ends, equalizers, and detectors that are specially tuned for the particular perpendicular and longitudinal fields of the readers as well as the characteristic signals produced by these fields in particular recording patterns.

In addition to processing user data, the read/write channel 1208 reads servo data from servo sectors 1214 on the magnetic disk 1210 via the read/write heads 1212. The servo sectors 1214 have a crosstrack width spanning two data tracks and include both longitudinal and perpendicular magnetic fields. The servo data are sent to a servo controller 1216, which uses the data to provide position control signals 1217 to an actuator such as a voice coil motor (VCM) 1218. The VCM 1218 rotates an arm 1220 upon which the read/write heads 1212 are mounted in response to the control signals 1217. The position control signals 1217 may also be sent to microactuators 1224 that individually control each of the read/write heads 1212, e.g., causing small displacements at each head. The apparatus 1200 may include multiple arms and VCMs (not shown), such that a surface of the disk 1210 can be accessed by multiple heads driven by different VCMs.

The apparatus 1200 also includes a vector magnetic recording module 1230 that assists in detecting and decoding user and servo data via the read transducers on the read/write heads 1212. In addition, the vector magnetic recording module 1230 may also assist in encoding and writing the data onto multiple tracks via the read/write heads 1212. As indicated by block 1232, the vector magnetic recording module 1230 includes a servo function that reads a burst field of the servo sectors 1214 via a first reader that spans the two data tracks. The first reader provides a first signal based on detecting a first total longitudinal field of the burst field. A second reader that spans the two data tracks reads the burst field, providing a second signal based on detecting a total perpendicular field of the two tracks. A position error 1233 of the first and second readers is determined using the first and second readers and can be used via the servo controller 1216.

As indicated by block 1234, the vector magnetic recording module 1230 includes a timing function that determines a timing error of at least one of the first and second readers that is caused by track-to-track phase errors. The servo function 1232 uses the position error to correct timing for bit transitions read from the data tracks, e.g., via inputs to the read/write channel 1208. For example, the servo function 1232 may use the signal generated from the longitudinal field reading a servo preamble or other known pattern to determine a magnitude and direction of the timing error. Based on a magnitude and orientation of the signal, a time reference may be sent to a detector of the read/write channel 1208 to aid in timing recovery.

As indicated by block 1236, the vector magnetic recording module 1230 includes an error recovery function that determines a signal 1237 from one of the longitudinal and perpendicular fields the servo sectors 1214 that can be used by the servo controller 1216 to correct for a read error encountered while reading a field of the servo sectors 1214. For example, the signal 1237 can be used to correct for a flipped bit in a Gray code encoded field of one of the servo sectors 1214.

Figure 13:
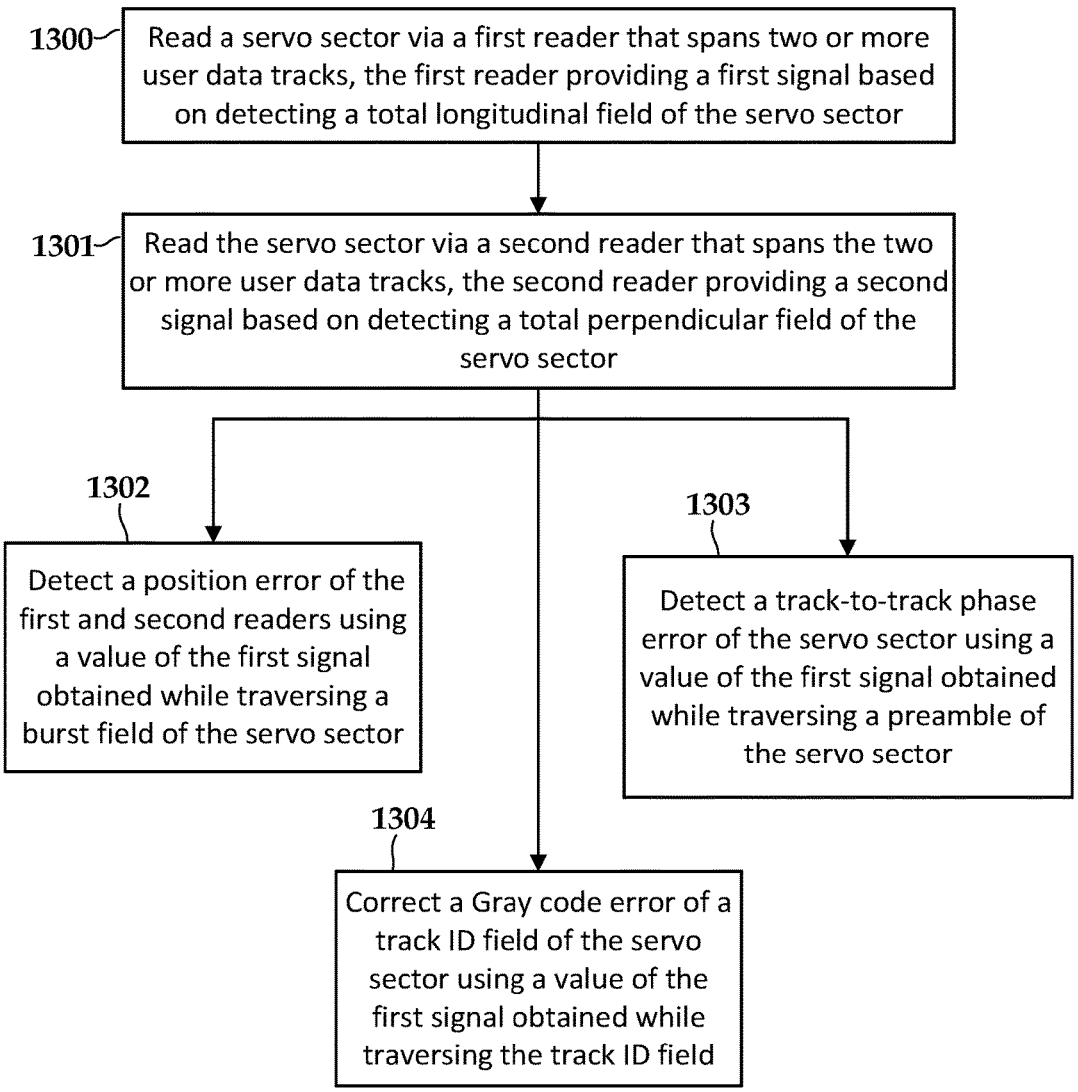
FIG. 13 is a flowchart of a method according to example embodiments.

In reference now to FIG. 13, a flowchart illustrates a method according to an example embodiment. The method involves reading 1300 a servo sector on a disk via a first reader that spans two or more user data tracks. The servo sector having a crosstrack width that spans the two or more user data tracks. The first reader provides a first signal based on detecting a first total longitudinal field of the servo sector. The servo sector is read 1301 via a second reader that spans the two or more user data tracks. The second reader provides a second signal based on detecting a total perpendicular field of the servo sector. Using the first signal, the method may involve any combination of: detecting 1302 a position error of the first and second readers using a value of the first signal obtained while traversing a burst field of the servo sector, detecting 1303 a track-to-track phase error of the servo sector using a value of the first signal obtained while traversing a preamble of the servo sector, and correcting 1304 a Gray code error of a track ID field of the servo sector using a value of the first signal obtained while traversing the track ID field.

Note that in any of the above embodiments, the two or more readers are generally configured to provide the two or more signals simultaneously, because all of the readers may be mounted on the same head or head-gimbal assembly that is held over the multiple tracks at the same time. Because the readers may have a fixed or known downtrack offset from each other, the decoding of user data may also involve buffering or otherwise time-delaying processing on some or all of the signals so that portions of the signals corresponding to aligned bits of adjacent tracks can be processed together.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:

reading a servo sector on a disk via a first reader that has a first effective width spanning two or more user data tracks, the servo sector having a crosstrack width that spans the two or more user data tracks, the first reader providing a first signal based on detecting a total longitudinal field of the servo sector;

reading the servo sector via a second reader that has a second effective width spanning the two or more user data tracks, the second reader providing a second signal based on detecting a total perpendicular field of the servo sector; and detecting a position error of the first and second readers using a value of the first signal obtained while traversing a burst field of the servo sector.

2. The method of claim 1, further comprising using the position error to align the first and second readers over the two or more user data tracks via a servo controller.

3. The method of claim 1, wherein the burst field is aligned with the two or more user data tracks and is the only burst field in the servo sector.

4. The method of claim 3, wherein adjacent burst fields on either crosstrack side of the burst field have an alternating perpendicular field with a phase opposite that of the burst field.

5. The method of claim 1, wherein detecting the position error of the first and second readers comprises using an amplitude of the first signal to determine an amplitude of the position error and using a sign of the first signal to determine a direction of the position error.

6. The method of claim 1, further comprising detecting a track-to-track phase error of the servo sector using a second value of the first signal obtained while traversing a preamble of the servo sector.

7. The method of claim 6, further comprising using the track-to-track phase error to perform timing recovery on the first and second readers via a read channel.

8. The method of claim 1, further comprising correcting a Gray code error of a track ID field of the servo sector using a second value of the first signal obtained while traversing the track ID field.

9. The method of claim 1, further comprising reading user data from the two or more user data tracks via the two or more data tracks, the two or more data tracks jointly encoding the user data.

10. An apparatus, comprising a controller operable to perform the method of claim 1.

11. A method, comprising:
reading a servo sector on a disk via a first reader that spans two or more user data tracks, the servo sector having a crosstrack width that spans the two or more user data tracks, the first reader providing a first signal based on detecting a total longitudinal field of the servo sector;
reading the servo sector via a second reader that spans the two or more user data tracks, the second reader providing a second signal based on detecting a total perpendicular field of the servo sector; and
detecting a track-to-track phase error of the servo sector using a value of the first signal obtained while traversing a preamble of the servo sector.

12. The method of claim 11, further comprising using the track-to-track phase error to perform timing recovery on the first and second readers via a read channel.

13. The method of claim 11, wherein detecting the track-to-track phase error of the first and second readers comprises using a maximum amplitude of the first signal to determine an amplitude of the position error and using a phase of the first signal to determine a direction of the position error.

14. The method of claim 11, further comprising detecting a position error of the first and second readers using a second value of the first signal obtained while traversing a burst field of the servo sector.

15. The method of claim 11, further comprising correcting a Gray code error of a track ID field of the servo sector using a second value of the first signal obtained while traversing the track ID field.

16. The method of claim 11, further comprising reading user data from the two or more user data tracks via the two or more data tracks, the two or more data tracks jointly encoding the user data.

17. An apparatus, comprising a controller operable to perform the method of claim 11.

18. A method comprising:
reading a servo sector on a disk via a first reader that spans two or more user data tracks, the servo sector having a crosstrack width that spans the two or more user data tracks, the first reader providing a first signal based on detecting a total longitudinal field of the servo sector;
reading the servo sector via a second reader that spans the two or more user data tracks, the second reader providing a second signal based on detecting a total perpendicular field of the servo sector; and
correcting a Gray code error of a track ID field of the servo sector using a value of the first signal obtained while traversing the track ID field.

19. The method of claim 18, further comprising using the corrected track ID field to position the first and second readers over the two or more user data tracks via a servo controller.

20. An apparatus, comprising a controller operable to perform the method of claim 18.

* * * * *